United States Patent [19]
Kato

[11] Patent Number: 5,455,642
[45] Date of Patent: Oct. 3, 1995

[54] PROGRESSIVE POWER LENS

[75] Inventor: Kazutoshi Kato, Suwa, Japan

[73] Assignee: Sieko Epson Corporation, Tokyo, Japan

[21] Appl. No.: 920,591

[22] PCT Filed: Dec. 25, 1991

[86] PCT No.: PCT/JP91/01759

§ 371 Date: Aug. 25, 1992

§ 102(e) Date: Aug. 25, 1992

[87] PCT Pub. No.: WO92/12452

PCT Pub. Date: Jul. 23, 1992

[30] Foreign Application Priority Data

Dec. 27, 1990 [JP] Japan ................................ 2-407863
Jan. 18, 1991 [JP] Japan ................................ 3-004304
Sep. 17, 1991 [JP] Japan ................................ 3-236346

[51] Int. Cl.⁶ ................................................ G02C 7/06
[52] U.S. Cl. ............................................... 351/169
[58] Field of Search ........................... 351/168–172

[56] References Cited

U.S. PATENT DOCUMENTS 4,606,622  8/1986  Fueter ................................ 351/169
4,729,651  3/1988  Kitani ................................. 351/169

FOREIGN PATENT DOCUMENTS 0291094  11/1988  European Pat. Off. .
6002972   4/1988   Japan .
5905841   5/1989   Japan .
2289818   1/1990   Japan .
6206750   1/1990   Japan .
62039769  1/1990   Japan .
6006171   9/1990   Japan .
9101508   2/1991   WIPO .

*Primary Examiner*—Scott J. Sugarman
*Attorney, Agent, or Firm*—Ladas & Parry

[57] ABSTRACT

In the present invention, the distance, the intermediate, and the reading portions are smoothly jointed together, and thereby the present invention provides a progressive power lens which is capable of enlarging an area, which provides an excellent field of view, by improving aberration of the lens body as well as reducing in weight and thickness.

The curvature of one of two refracting interfaces of the distance portion or the reading portion varies along the principal gazing line from the vicinity of the center of the lens toward the peripheral portion thereof, the refracting interfaces oppositely facing to each other.

13 Claims, 6 Drawing Sheets

PRIOR ART

F I G . 9B

PRIOR ART

PROGRESSIVE POWER LENS

BACKGROUND OF THE INVENTION

The present invention relates to a configuration of a progressive power lens for correcting presbyopia, and particularly relates to a progressive power lens which is capable of reducing in weight and thickness as well as providing an excellent field of view by improving aberration thereof.

BACKGROUND ART

Figure 9A:
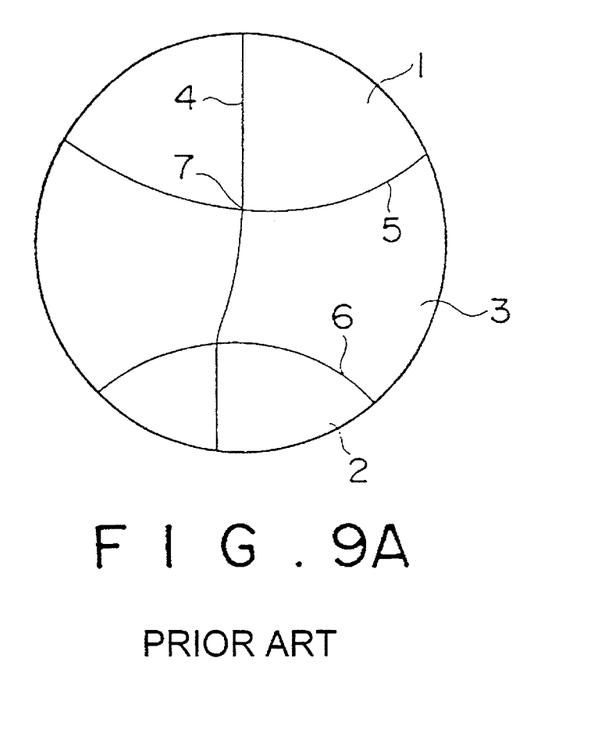
FIG. 9A is a front elevation of a conventional progressive power lens.

As typically shown in Japanese examined patent publication No. 52(1977)-20271, conventional progressive power lenses consist of a region used for seeing relatively distant objects (hereinafter referred to as distant portion), a region for seeing relatively near objects (hereinafter referred to as reading portion), and a region, located between the distance portion and the reading portion, for seeing objects which are at intermediate distances. These portions are arranged as shown in FIG. 9A. Here, in FIG. 9A the reference numeral 1 designates a distance portion, 2 a reading portion, and 3 an intermediate portion. The distance portion 1 and the intermediate portion are imaginally separated by the boundary line 5 whereas the intermediate portion and the reading portion 2 the boundary line 6. In practical lenses, regions are however smoothly joined to each other, and there is no clear boundary line. Furthermore, each of the regions is substantially and horizontally divided by the principal gazing line. The principal gazing line is an imaginary line along the movement of the line of sight when the spectacles are put. In progressive power lenses, objects are often watched in the vicinity of the principal gazing line, and this portion is particularly carefully designed in view of optical performance.

In a single progressive power lens, there are three different regions; a distance portion 1, a reading portion 2 and an intermediate portion 3, and thus importance of design is conventionally placed on how to smoothly join these regions. For this reason, many inventions are made to smoothly connect the regions by forming refracting surfaces into complicated aspherical shapes.

Figure 11:
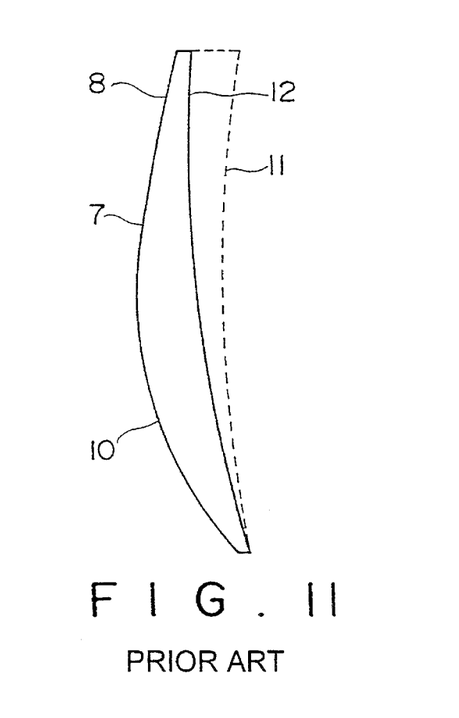
FIG. 11 is a cross-sectional view of the conventional progressive power lens.

FIG. 11 illustrates a section of this progressive power lens taken along the vertical principal gazing line which passes substantially centrally each of the regions previously described. In the sectional shape of each of conventional progressive power lenses, the object side refracting surface 8 has a feature such that the lower portion of the lens is more bent toward the eyeball than the upper portion. For this reason, a lens which is thin in the reading portion and thick in the distance portion is, as indicated by the broken line 11 in FIG. 11, produced when the lens is produced according to the ordinary method without any prescription for prismatic power. To improve the thickness of this distance portion, a prism which has no object to correct squint of the base in the direction of 270° is put or provided, and processing is made as shown in the solid line 12, so that reduction in thickness is achieved not only in the distance portion but also in the whole lens.

In Japanese examined patent publication No. 2(1990)-39769, improvement of chromatic aberration in the reading portion and reduction in thickness are achieved by providing a prism with the base in the direction of 90° in the case where the distance portion region 1 has a prescription for correcting myopia.

In general lenses, there are defects in optical performance called aberration, and in portions which are away from the optical axis 7 substantially at the center of the lens, these often produce problems which appear as fuzziness and distortion of images. Particularly, large refractive power lenses are necessary to improve aberration. In conventional progressive power lenses, there has been no attempt to improve in aberration since emphasis has been placed on how to smoothly join three regions as previously described. Accordingly, the present invention provides a progressive power lens which is capable of obtaining a good visual field by improving aberration thereof as well as smoothly joining the three regions.

In the case where in a lens having a prescription for correcting myopia in the distance portion region 1 a prism is put with the base in the direction of 270°, the lens becomes thick and heavy instead of being reduced in thickness as mentioned in Japanese examined patent publication No. 2(1990)-39769. Futhermore, in Japanese examined patent publication No. 2(1990)-39769, an emphasis is placed on improvement in chromatic aberration of the reading portion, and it has been found that the prism wholly added is excessively large and thereby thickens the lens although reduction in thickness may be possible by chance to a specific prescription.

SUMMARY OF THE INVENTION

Accordingly, it is an object of the present invention to provide a progressive power lens which is capable of improving problems the prior art previously mentioned has, and thereby reducing in weight and thickness as well as obtaining a good visual field by improving in aberration.
Disclosure of the Invention In a progressive power lens which includes a distance portion 1 for looking a location at a relatively long distance, a reading portion 2 for looking a location at a relatively short distance, and an intermediate portion 3 between the distance portion and the reading portion for looking a location at a relatively intermediate distance, the present invention is characterized in that the curvature of at least one of the oppositely facing refracting surfaces of the distance portion is changed along principal gazing line 4 from the vicinity of the center to the peripheral portion of the lens according to a predetermined rule.

In a progressive power lens of which the distance portion 1 or the reading portion 2 has a positive refractive power, one refracting surface 8 of the two oppositely facing refracting in surfaces is reduced in curvature at a substantially constant rate from the vicinity of the center of the lens to the peripheral portion thereof, the one refracting surface being on the side of an object.

In a progressive power lens of which distance portion 1 or the reading portion 2 has a positive refractive power, one refracting surface 9 of the two oppositely facing refracting surfaces increases in curvature at a substantially constant rate from the vicinity of the center of the lens to the peripheral portion thereof, the one refracting surface being on the side of an eye ball.

In a progressive power lens of which the distance portion 1 or the reading portion 2 has a negative refractive power, one refracting surface 8 of the two oppositely facing refracting surfaces increases in curvature from the vicinity of the center of the lens to the peripheral portion thereof, the one refracting surfaces being on the side of an object.

In a progressive power lens of which the distance portion 1 or the reading portion 2 has a negative refractive power, one refracting surface 8 of the two oppositely facing refracting surfaces once increases and is then reduced in curvature from the vicinity of the center of the lens to the peripheral portion thereof, the one refracting surface being on the side of an object.

In a progressive power lens of which distance portion 1 has a negative refractive power, one refracting surface 9 of the two oppositely facing refracting surfaces is reduced in curvature from the vicinity of the center of the lens to the peripheral portion thereof, the one refracting surface being on the side of an eye ball.

In a progressive power lens of which the distance portion 1 has a negative refractive power, one refracting surface 9 of the two oppositely facing refracting surfaces increases in curvature after once reduced, the one refracting surfaces being on the side of an eye ball.

In a progressive power lens which includes a distance portion 1 for looking a location at a relatively long distance, a reading portion 2 for looking a location at a relatively short distance, and an intermediate portion 3 between the distance portion and the reading portion for looking a location at a relatively intermediate distance, it is characterized in that the curvature of at least one of the oppositely facing refracting surfaces of the reading portion 2 changes along principal gazing line 4 from the vicinity of the center to the peripheral portion of the lens.

The curvature of the distance portion 1 has a constant value at an interval of at least 12 mm from the vicinity of the center to the peripheral portion of the distance portion, and is then changed.

The curvature of the reading portion 2 has a constant value at an interval of at least 7 mm from the vicinity of the center to the peripheral portion of the reading portion, and is then changed.

In a progressive power lens which has a prescription for correcting myopia in the distance portion region, characterized in that a prism, having a magnitude Pt, is provided with a base in the direction of 90°, the prism having no object to cure strabismus, the Pt satisfying the following relationship:

$$-\frac{(4.0 - \text{ADD})}{9} \times PW \leq Pt \leq -\frac{(8.0 - \text{ADD})}{9} \times PW$$

where PW is the prescription for correcting myopia and ADD a addition power.

It is characterized in that a plastic material having a refractive index of not smaller than 1.55 is used.

In progressive power lenses, there is an aberration which is characteristic to them and is produced by a refractive surface in a spherical shape to smoothly join three different regions, the distant portion 1, the reading portion 2 and the intermediate portion 3, in addition to an aberration produced in general corrective lenses, and hence the region which provides a good visual field is very small. To reduce the aberration of a corrective lens as small as possible, the curvature of the object side refractive surface must be set relatively large. This not only bars against reduction in weight and thickness but also deteriorates the appearance when used as spectacles lens.

The present invention is capable of achieving improvement in aberration which may be produced in corrective lenses, and the region which provides a good visual field is hence enlarged. Furthermore, the object side refractive surfaces may be freely set in curvature, and this enables reduction in weight and thickness and the appearance to be improved.

Another advantageous effect of the progressive power lens of the present invention is that in a lens which has a prescription for correcting myopia in the distance portion, the thinnest and lightest lens may be provided by adding a predetermined amount of a prism with the base in the direction of 90° when the lens is fitted into a frame, without deteriorating mechanical strength of the lens at all.

To simplify the description of this embodiment, explanation is given along an example of spherical power but similar advantageous effects may be obtained in the case of astigmatism lenses. Particularly, without being influenced by the direction of the astigmatism axis the thinnest and the lightest lens may be realized by making vertical power component PW.

Furthermore, the effects of the reduction in weight and thickness become rather larger by using a plastic having an index of refraction larger than n=1.55 as a lens material.

DESCRIPTION OF THE PREFERRED EMBODIMENTS

To illustrate the present invention in more detail, explanation will be made with reference to the accompanying drawings hereinafter.

(Embodiment 1)

Figure 1A:
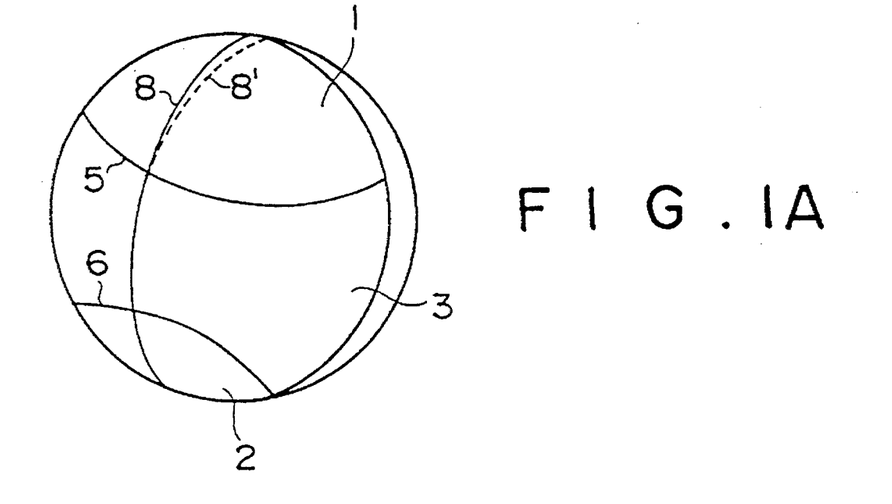
FIG. 1A is a perspective view of one embodiment of a progressive power lens according to the present invention.
Figure 1B:
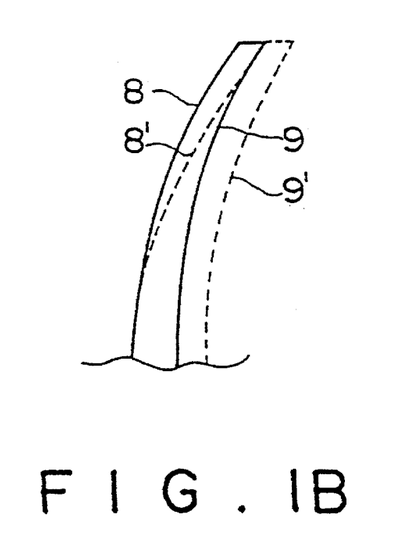
FIG. 1B is a cross-sectional view of the distance portion of the same lens.

FIG. 1A is a general view of a progressive power lens as a first embodiment of the present invention. The distance portion 1 has a refractive power of +3.00 dioptry (hereinafter referred to as D) whereas the reading portion 2 has a refractive power of +5.00 [D]. The refractive index of the lens is n=1.60. The different in refractive power between the reading portion 2 and distance portion 1 is referred to as addition power, and the addition power of this embodiment is 2.00 [D]. A cross-section of the lens distance portion 1 taken along the principal gazing line is shown in FIG. 1B, in which the numeral 8 indicates a refracting surface on the object side of the lens, and 9 a refracting surface on the eyeball side. 8' and 9' shown by the broken line design refracting surfaces of a conventional progressive power lens. Although the conventional refracting surface 8' has a constant curvature, the refracting surface 8 of the present invention reduces in curvature from the vicinity of the center toward the peripheral portion of the lens. Table 1 shows curvatures of object side refracting interfaces of lenses of the present invention and the prior art.

TABLE 1

| | Distance from the Center of Lens [mm] | | | | | |
|---|---|---|---|---|---|---|
| | 0 | 5 | 10 | 15 | 20 | 25 |
| Curvature of the Present Invention ($m^{-1}$) | 8.40 | 8.24 | 8.07 | 7.90 | 7.73 | 7.56 |
| Curvature of the Conventional Lens ($m^{-1}$) | 8.40 | 8.40 | 8.40 | 8.40 | 8.40 | 8.40 |

Figure 1C:
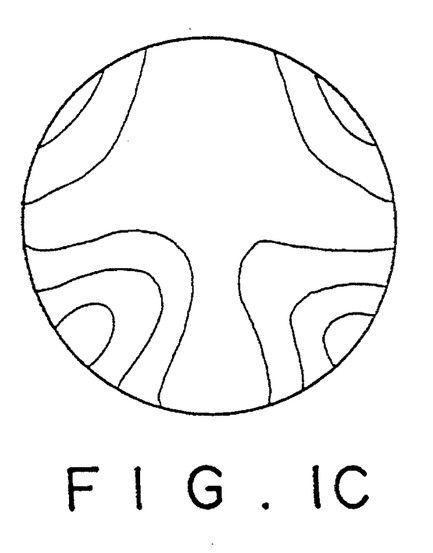
FIG. 1C is a view of the astigmatism.
Figure 9B:
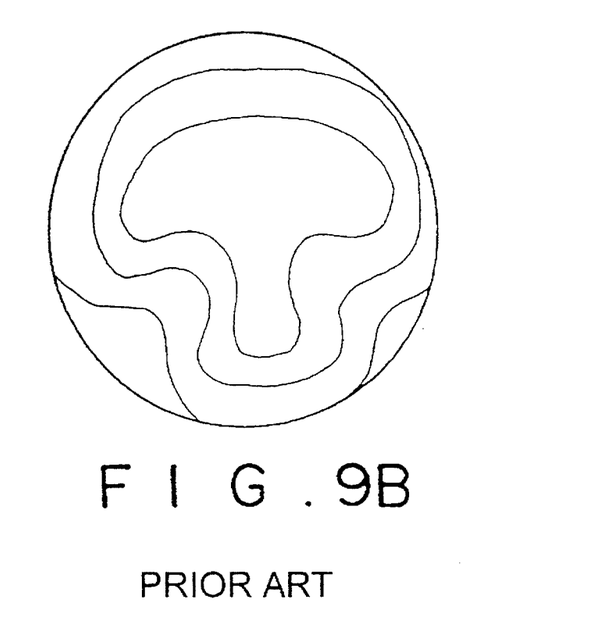
FIG. 9B is a view of astigmatism of the conventional progressive power lens.
Figure 10:
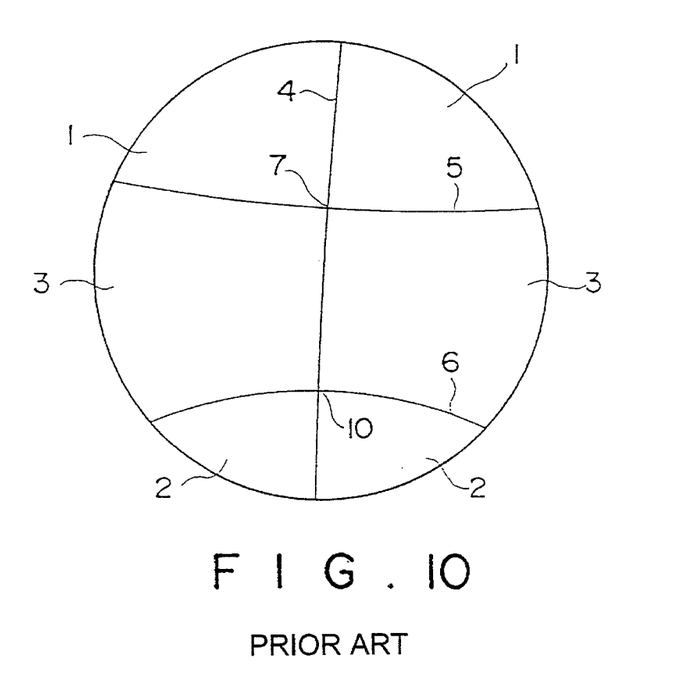
FIG. 10 is a front view of another conventional progressive power lens.

FIG. 1C shows a view of the astigmatism of a progressive power lens of the present invention. As compared with a view of the astigmatism (FIG. 9B) of a conventional lens, the distance portion 1 reduces in astigmatism in an upper peripheral portion thereof, and thus an area which gives a field of good view is widened. Moreover, in this embodiment the object side refracting surface 8 is reduced in curvature, and hence as shown in FIG. 1B the thickness of the vicinity of the center of the lens is reduced. This provides an advantageous effect in reduction in weight and thickness.

(Embodiment 2)

Figure 2A:
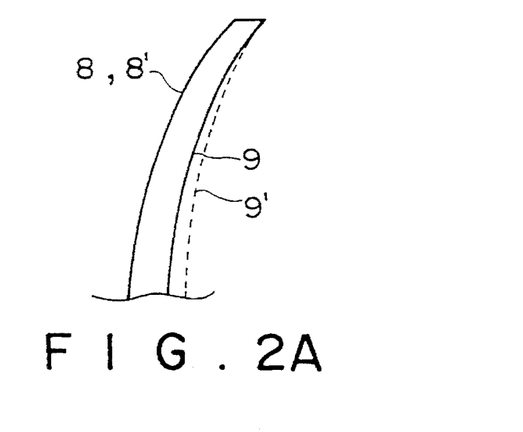
FIG. 2A is a cross-sectional view of the distance portion of a progressive power lens of a second embodiment of the present invention.

FIG. 2A is a sectional view of the distance portion of a second embodiment of the present invention. In this embodiment, the distance refractive power is +4.00[D], addition power 3.00[D], and refractive index n=1.60. Although in this embodiment the object side refracting surface 8 is the same as the that of the conventional lens, the refracting surface of the eyeball side increases in curvature from the center toward the periphery. Table 2 shows the curvature of the eyeball side refracting surface of this embodiment.

TABLE 2

| | Distance from the Center of Lens [mm] | | | | | |
|---|---|---|---|---|---|---|
| | 0 | 5 | 10 | 15 | 20 | 25 |
| Curvature of the Present Invention ($m^{-1}$) | 3.59 | 3.86 | 4.13 | 4.41 | 4.68 | 4.96 |
| Curvature of the Conventional Lens ($m^{-1}$) | 3.59 | 3.59 | 3.59 | 3.59 | 3.59 | 3.59 |

Figure 2B:
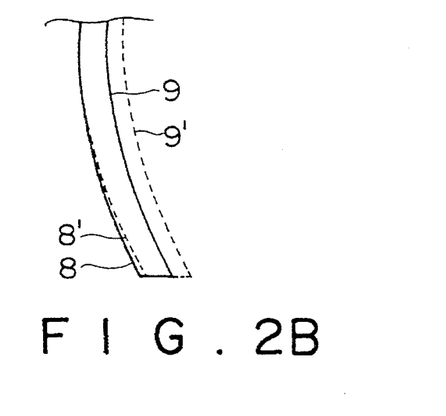
FIG. 2B is a sectional view of the reading portion of the same lens.

FIG. 2B is a sectional view of the reading portion 2. From an upper end point of the reading portion 2 toward the lower peripheral portion of the lens, the object side refracting surface 8 is reduced in curvature whereas the eyeball side refracting surface 9 increases in curvature. To facilitate the fabrication of the lens, in this embodiment the eyeball side refracting surface 9 is set to similarly change in curvature in both the distance portion 1 and the reading portion 2 but may be set to change differently in the distance portion and the reading portion.

(Embodiment 3)

Figure 3A:
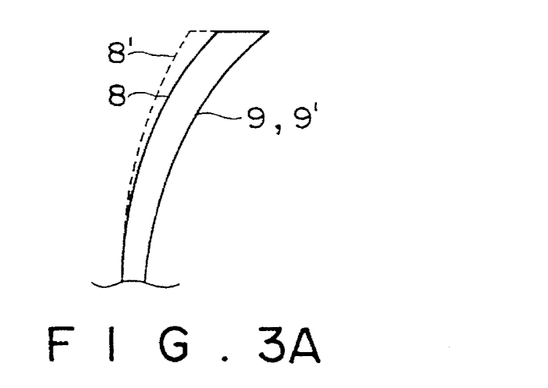
FIG. 3A is a sectional view of the distance portion of a progressive power lens of a third embodiment of the present invention.

FIG. 3A is a sectional view of the distance portion of a progressive power lens, as a third embodiment of the present invention, having a distance refractive power of −6.00[D], an addition power of 1.00[D], and a refractive index of n=1.56. In this embodiment, the object side refracting surface 8 increases in curvature toward the peripheral portion. Changes in curvature are given in Table 3.

TABLE 3

| | Distance from the Center of Lens [mm] | | | | |
|---|---|---|---|---|---|
| | 0 | 10 | 20 | 30 | 40 |
| Curvature of the Present Invention ($m^{-1}$) | 1.68 | 2.02 | 2.52 | 3.03 | 2.69 |
| Curvature of the Conventional Lens ($m^{-1}$) | 1.68 | 1.68 | 1.68 | 1.68 | 1.68 |

In this embodiment the lens increases in curvature to a distance of 30 mm from the center thereof, and decreases in curvature in the peripheral portion.

Figure 3B:
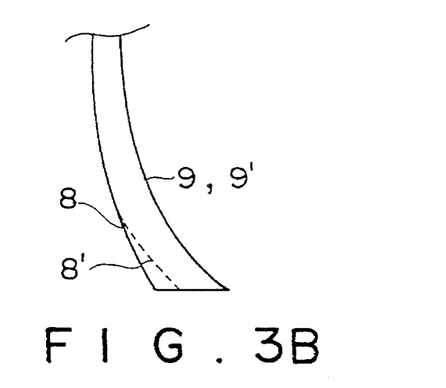
FIG. 3B is a sectional view of the reading portion of the same lens.

FIG. 3B shows a sectional view of the reading portion of this embodiment. The curvature decreases toward the peripheral portion.

(Embodiment 4)

Figure 4A:
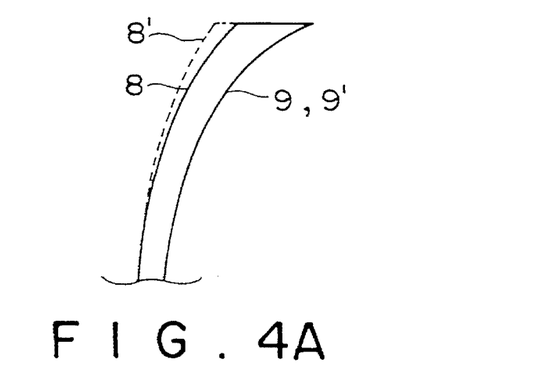
FIG. 4A is a sectional view of the distance portion of a progressive power lens of a fourth embodiment of the present invention.

FIG. 4A is a sectional view of the distance portion of a fourth embodiment of the present invention. The distance refractive power is −5.00[D], addition power 2.50[D], and refractive index n=1.60. In this embodiment there is no change in curvature to a portion 12 mm away from the center, and the peripheral portion beyond 12 mm the curvature increases. This provides a substantially constant refractive power within a range to a distance of 12 mm from the center, and when spectacles slip down to some extent, they may be used without deteriorating visual power.

Figure 4B:
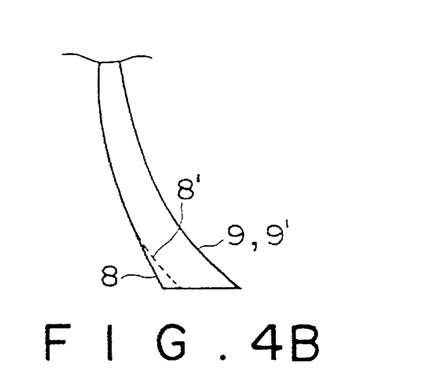
FIG. 4B is a sectional view of the reading portion of the same lens.

FIG. 4B is a sectional veiw of the reading portion of this embodiment. There is no change in curvature from the upper end of the reading portion to a distance of 7 mm, beyond which the curvature reduces in the peripheral portion. For this reason, to a distance of 7 mm from the upper end of the reading portion there is a region of which refractive power is constant.

(Embodiment 5)

Figure 5:
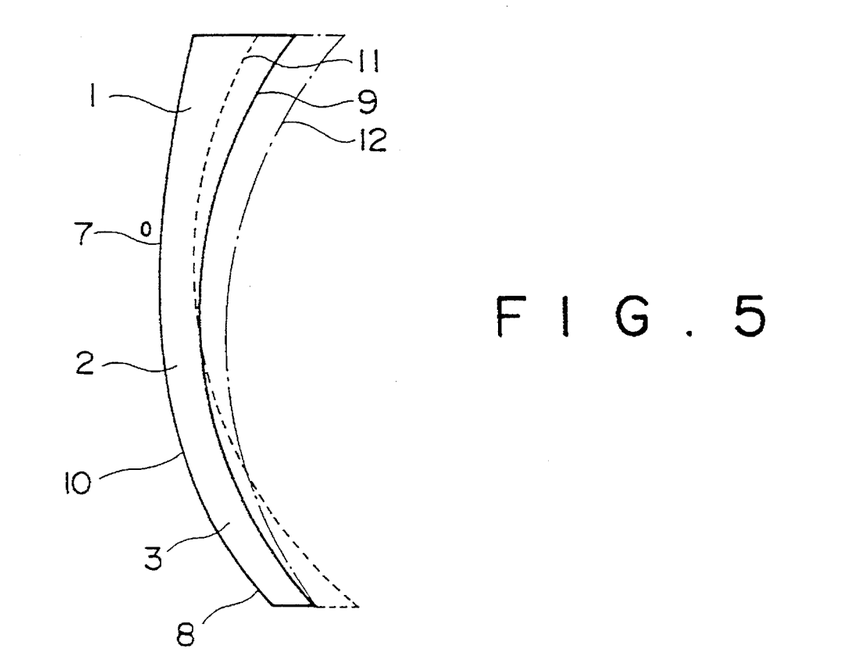
FIG. 5 is a sectional view of a progressive power lens according to the present invention.
Figure 8:
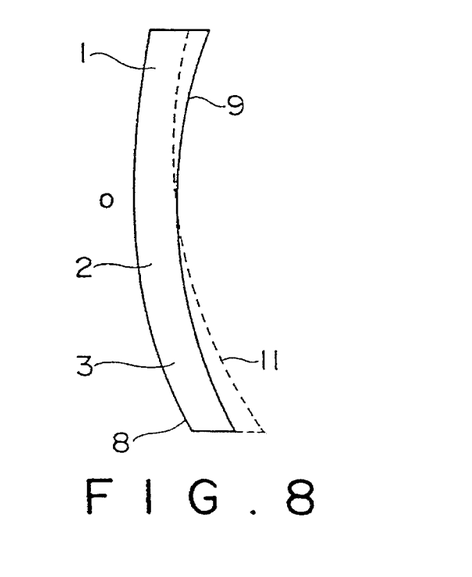
FIG. 8 is a cross-sectional view showing a state in which the progressive power lens of the present invention is fitted in a frame.

FIG. 5 is a sectional view of a progressive power lens of the present invention. To compare with the prior art an eyeball side refracting surface 11 is shown by the broken line in the case where a prism is provided with the base in the direction of 270° whereas an eyeball side refracting surface 12 is indicated by the dot-and-dash line in the case where a prism is placed with the base in the direction of 90° as in Japanese patent examined publication 2 (1990)-39769. Comparing the refracting surface 11 with the refracting surface 9 of the present invention, in the distance portion 1 the lens with the refracting surface 11 is thinner whereas the lens of the present invention is thinner in both the intermediate portion and the reading portion 2. It might appear that as the whole lens the present invention does not provide any effect of reduction in thickness. It is however to be noted that in the case where a progressive power lens is fitted in a frame as a spectacle lens, it is usual that as shown in FIG. 8 the fitting point 0 is set upwardly of the vertical center of the frame. The area of the distance portion region 1 thus becomes smaller than the area which puts areas of the intermediate portion region 3 and the reading portion region 2 together, and as a result reduction in thickness may be achieved.

In Japanese examined patent publication 2 (1990)-39769, the prism is relatively large, and the lens excessively reduces in thickness at a lower portion of the reading portion. This reduces mechanical strength of the lens, and hence lenses may be destroyed or damaged during the processing of frame fitting, for example. To provide a sufficient thickness to the lower portion of the lens to avoid this, it is involved that the whole lens must be thick as indicated by the refracting surface 12 of FIG. 5.

In the present invention, the refracting surfaces 8 and 9 are arranged substantially in parallel with each other over both the intermediate portion region 3 and the reading portion region 2, and it is thus possible to ensure the necessary minimum thickness from the center to the lower edge of the lens. This necessary minimum thickness depends on the strength of the lens material, and it is thus meaningless to equally set it. However in prescription for correcting myopia, the vicinity of the center of the lens is generally the thinnest, and the thickness of this portion may be considered the minimum thickness which ensures the mechanical strength of the lens. The lens of the present invention has substantially equal thickness from the center to the reading portion lower edge, and the present invention is capable of provide the thinnest and the lightest lens which ensures the mechanical strength.

According to studies of the inventors, the optimal prism Pt is given by the prescription for correcting myopia PW and addition power ADD of the distance portion as in Table 4 when the optimal prism Pt is set so that the lens has a substantially equal thickness from the center to the lower edge of the reading portion.

TABLE 4

| PW | ADD | | | | | |
| --- | --- | --- | --- | --- | --- | --- |
|  | 1.00 | 1.50 | 2.00 | 2.50 | 3.00 | 3.50 |
| −1.0 | 0.66 | 0.61 | 0.55 | 0.50 | 0.44 | 0.38 |

TABLE 4-continued

| PW | ADD | | | | | |
| --- | --- | --- | --- | --- | --- | --- |
|  | 1.00 | 1.50 | 2.00 | 2.50 | 3.00 | 3.50 |
| −2.0 | 1.33 | 1.22 | 1.11 | 1.00 | 0.88 | 0.77 |
| −3.0 | 2.00 | 1.83 | 1.66 | 1.50 | 1.33 | 1.16 |
| −4.0 | 2.66 | 2.44 | 2.25 | 2.00 | 1.78 | 1.55 |
| −5.0 | 3.33 | 3.05 | 2.78 | 2.50 | 2.22 | 1.94 |
| −6.0 | 4.00 | 3.66 | 3.33 | 3.00 | 2.67 | 2.33 |
| −7.0 | 4.67 | 4.27 | 3.89 | 3.50 | 3.11 | 2.72 |
| −8.0 | 5.33 | 4.89 | 4.44 | 4.00 | 3.56 | 3.11 |

Pt in Table 4 may be expressed as follows, using PW and ADD:

$$-\frac{(4.0 - ADD)}{9} \times PW \leq Pt \leq -\frac{(8.0 - ADD)}{9} \times PW$$

The equation above shows that the value of Pt may be defined by PW ADD with a range. According to studies of the inventors, the largest effect for reduction in weight and thickness is achieved when Pt is set as given in Table 4, but it has been found that reduction in weight and thickness may be achieved as compared to conventional lens also when Pt is set within the range defined by the above equation. Pt has a unit of PD (prism diopter) and PW and ADD each have a unit of D (diopter).

(Embodiment 6)

Figure 6:
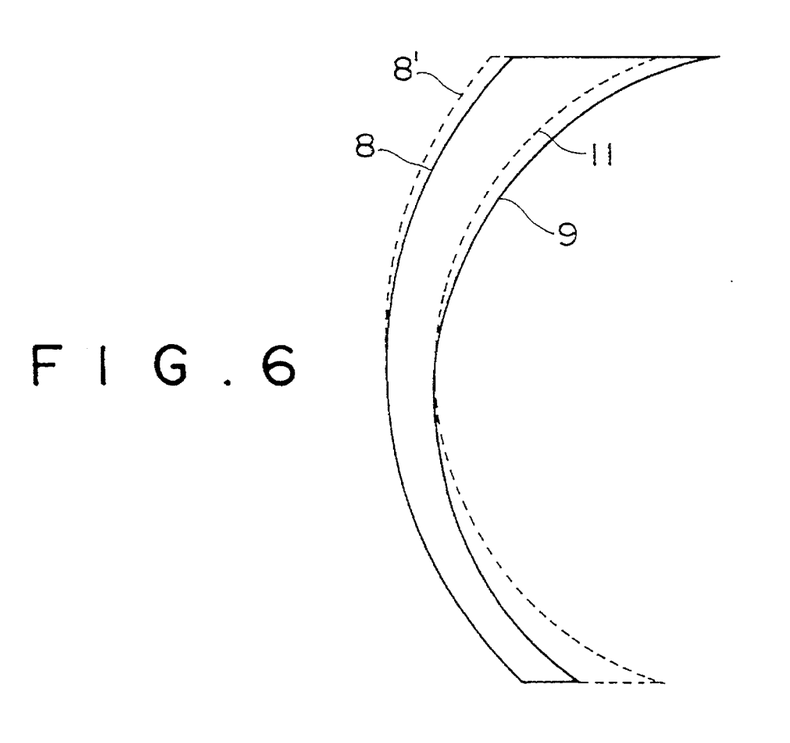
FIG. 6 is a sectional view of a progressive power lens according to the present invention.

FIG. 6 illustrates a sectional view of a lens of this embodiment. The object side refracting surface 8 in the distance portion has the same curvature change as that described in the embodiment 3. The lens has a distance power of −6.00 [D], a addition power of 1.00 [D], and a refractive index of 1.56. The eyeball side refracting interface 9 is inclined so that the lens is provided with a prism of 4.00 [PD] having the base in the direction of 90°. In this embodiment, reduction in weight and thickness given by the eyeball side refracting surface 9 is added to that by the object side refracting interface 8, and thereby a very thin progressive power lens may be provided.

(Embodiment 7)

Figure 7:
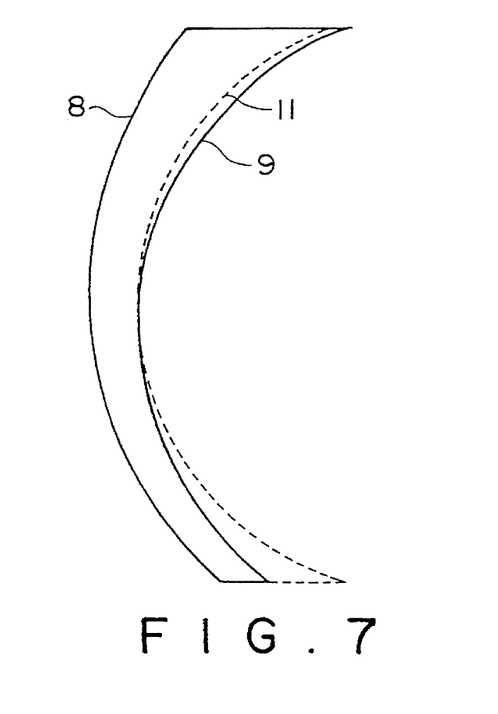
FIG. 7 is a sectional view of a progressive power lens as a seventh embodiment of the present invention.

FIG. 7 illustrates a sectional view of a lens of this embodiment. The distance power is −5.00 [D], the addition power 3.00 [D], and the refractive index 1.60. In this embodiment, the object side refracting surface 8 has a constant curvature in the distance portion 1 as in conventional lens but the eyeball side refracting surface 9 varies in the distance portion as in Table 5. Furthermore, a prism of 2.50 [PD] is provided with the base in the direction of 90° for achieving reduction in weight and thickness.

TABLE 5

| | Distance from the Center of Lens [mm] | | | | | |
| --- | --- | --- | --- | --- | --- | --- |
| | 0 | 5 | 10 | 15 | 20 | 25 |
| Curvature of the Present Invention ($m^{-1}$) | 12.50 | 12.27 | 12.01 | 11.76 | 11.58 | 11.82 |
| Curvature of the Conventional Lens | 12.50 | 12.50 | 12.50 | 12.50 | 12.50 | 12.50 |

TABLE 5-continued

| | Distance from the Center of Lens [mm] | | | | | |
|---|---|---|---|---|---|---|
| | 0 | 5 | 10 | 15 | 20 | 25 |
| $(m^{-1})$ | | | | | | |

(Embodiment 8)

In this embodiment, an example is given, having a spherical power of +3.50 D, a addition power of 3.50 D and a refractive index of 1.60.

Table 6 shows curvature of the object side refracting surface in the distance portion. The curvature is constant from the center to a distance of 12 mm, beyond which it is reduced at a substantially constant rate.

TABLE 6

| | Distance from the Center of Lens [mm] | | | | | | | |
|---|---|---|---|---|---|---|---|---|
| | 0 | 3 | 6 | 9 | 12 | 15 | 18 | 21 |
| Curvature of the Present Invention $(m^{-1})$ | 10.0 | 10.0 | 10.0 | 10.0 | 10.0 | 9.7 | 9.4 | 9.2 |
| Curvature of the Conventional Lens $(m^{-1})$ | 10.0 | 10.0 | 10.0 | 10.0 | 10.0 | 10.0 | 10.0 | 10.0 |

Table 7 indicates the curvature of the reading portion object side refracting surface of this embodiment. In this embodiment the progressive power zone is located within a distance of 16 mm from the center, and within this interval the curvature increases. The reading portion is in the peripheral side outside the interval of 16 mm. In this embodiment, the curvature is constant in the interval of 7 mm from the distance of 16 mm to 23 mm, and is constantly reduced in the peripheral portion beyond the distance of 23 mm.

TABLE 7

| | Distance from the Center of Lens [mm] | | | | | | | |
|---|---|---|---|---|---|---|---|---|
| | 0 | 5 | 10 | 16 | 20 | 23 | 28 | 33 |
| Curvature of the Present Invention $(m^{-1})$ | 10.0 | 11.8 | 13.7 | 15.8 | 15.8 | 15.8 | 15.2 | 14.5 |
| Curvature of the Conventional Lens $(m^{-1})$ | 10.0 | 11.8 | 13.7 | 15.8 | 15.8 | 15.8 | 15.8 | 15.8 |

(Embodiment 9)

In this embodiment, as in embodiment 8, an example is given, having a spherical power of +3.50 D, a addition power of 3.50 D and a refractive index of 1.60. In this embodiment the lens is the same in the object side refracting surface as conventional progressive power lenses but the eyeball side refracting surface is constructed according to the present invention.

Table 8 shows the curvature of the eyeball side refracting surface in the distance portion. The curvature is constant to a distance of 12 mm from the center, and is then increased at a substantially constant rate.

TABLE 8

| | Distance from the Center of Lens [mm] | | | | | | | |
|---|---|---|---|---|---|---|---|---|
| | 0 | 3 | 6 | 9 | 12 | 15 | 18 | 21 |
| Curvature of the Present Invention $(m^{-1})$ | 4.4 | 4.4 | 4.4 | 4.4 | 4.4 | 4.8 | 5.2 | 5.6 |

Table 9 shows the curvature of the reading portion eyeball side refracting interface. The curvature is constant from the center to a distance of 23 mm, beyond which it increases at a predetermine rate. Since a progressive power zone is given in the range from the center to a distance 16 mm, the reading portion is constant in curvature within the range of 7 mm as described in the embodiment 8.

TABLE 9

| | Distance from the Center of Lens [mm] | | | | | | | |
|---|---|---|---|---|---|---|---|---|
| | 0 | 10 | 15 | 20 | 23 | 27 | 31 | 35 |
| Curvature of the Present Invention $(m^{-1})$ | 4.4 | 4.4 | 4.4 | 4.4 | 4.4 | 4.6 | 4.8 | 5.0 |

(Embodiment 10)

In this embodiment, an example is given, having a spherical power of −6.00 D, a addition power of 3.50 D and a refractive index of 1.60.

Table 10 shows curvature of the object side refracting surface in the distance portion. The curvature is constant from the center to a distance of 15 mm, beyond which it is reduced to a distance of 35 mm at a substantially constant rate, and the curvature increases in the peripheral portion.

TABLE 10

| | Distance from the Center of Lens [mm] | | | | | | | |
|---|---|---|---|---|---|---|---|---|
| | 0 | 10 | 15 | 20 | 25 | 30 | 35 | 40 |
| Curvature of the Present Invention $(m^{-1})$ | 15.0 | 15.0 | 15.0 | 14.5 | 14.1 | 14.7 | 13.3 | 14.9 |

Table 11 indicates the curvature of the reading portion object side refracting surface of this embodiment. In this embodiment the progressive power zone is located within a distance of 16 mm from the center, and within this interval the curvature is constant. The reading portion is in the peripheral side outside the interval of 16 mm. In this embodiment, the curvature is constant in the interval of 7 mm from the distance of 16 mm to 23 mm, and constantly increases in the peripheral portion beyond the distance of 23 mm.

TABLE 11

| Distance from the Center of Lens [mm] | | | | | | | |
| --- | --- | --- | --- | --- | --- | --- | --- |
| 0 | 5 | 10 | 16 | 20 | 23 | 28 | 33 |
| Curvature of the Present Invention ($m^{-1}$) | | | | | | | |
| 15.0 | 15.0 | 15.0 | 15.0 | 15.0 | 15.0 | 15.4 | 15.8 |

(Embodiment 11)

In this embodiment, as in embodiment 10, an example is given, having a spherical power of −6.00 D, a addition power of 3.50 D and a refractive index of 1.60.

Table 12 shows curvature of the object side refracting surface in the distance portion. The curvature is constant from the center to a distance of 15 mm, beyond which it increases to a distance of 35 mm at a substantially constant rate, and the curvature reduces in the peripheral portion.

TABLE 12

| Distance from the Center of Lens [mm] | | | | | | | |
| --- | --- | --- | --- | --- | --- | --- | --- |
| 0 | 10 | 15 | 20 | 25 | 30 | 35 | 40 |
| Curvature of the Present Invention ($m^{-1}$) | | | | | | | |
| 1.7 | 1.7 | 1.7 | 2.1 | 2.5 | 2.9 | 3.8 | 3.0 |

Table 13 indicates the curvature of the reading portion object side refracting surface of this embodiment. In this embodiment the progressive power zone is located within a distance of 16 mm from the center, and within this interval the curvature increases. The reading portion is in the peripheral side outside the interval of 16 mm. In this embodiment, the curvature is constant in the interval of 7 mm from the distance of 16 mm to 23 mm, and constantly increases in the peripheral portion beyond the distance of 23 mm.

TABLE 13

| Distance from the Center of Lens [mm] | | | | | | | |
| --- | --- | --- | --- | --- | --- | --- | --- |
| 0 | 5 | 10 | 16 | 20 | 23 | 28 | 33 |
| Curvature of the Present Invention ($m^{-1}$) | | | | | | | |
| 1.7 | 3.5 | 5.3 | 7.5 | 7.0 | 6.5 | 6.0 | 5.5 |

Industrial Utility

As previously described, progressive power lenses according to the present invention are suitable for lenses for correcting presbyopia, having three different areas; a distance portion, a reading portion, and an intermediate portion.

What is claimed is:

1. A progressive power lens comprising a distance portion (1) having a positive refractive power for looking at a location at a relatively long distance, a reading portion (2) for looking at a location at a relatively short distance, and an intermediate portion (3) between the distance portion and the reading portion for looking at a location at a relatively intermediate distance, the curvature of at least one of the oppositely facing refracting surface of the distance portion being reduced in curvature along a principal gazing line (4) of the lens at a substantially constant rate from the vicinity of the center of the lens to the peripheral portion thereof, the one refracting surface being on side of an object.

2. A progressive power lens as recited in claim 1, wherein the curvature of the distance portion (1) has a constant value at an interval of at least 12 mm from the vicinity of the center to the peripheral portion of the distance portion, and then changes.

3. A progressive power lens as recited in claim 1, characterized in that a plastic material having a refractive index of not smaller than 1.55 is used.

4. A progressive power lens comprising a distance portion (1) having a positive refractive power for looking at a location at a relatively long distance, a reading portion (2) for looking at a location at a relatively short distance, and an intermediate portion (3) between the distance portion and the reading portion for looking at a location at a relatively intermediate distance, the curvature of at least one of the oppositely facing refracting surfaces of the distance portion being increased in curvature along a principal gazing line (4) of the lens at a substantially constant rate from the vicinity of the center of the lens to the peripheral portion thereof, the one refracting surface being on the side of an eye ball.

5. A progressive power lens comprising a distance portion (1) having a negative refractive power for looking at a location at a relatively long distance, a reading portion (2) for looking at a location at a relatively short distance, and an intermediate portion (3) between the distance portion and the reading portion for looking at a location at a intermediate distance, the curvature of at least one of the oppositely facing refracting surface of the distance portion being increased in curvature from the vicinity of the center of the lens to the peripheral thereof, the one refracting surface being on the side of an object.

6. A progressive power lens as recited in claim 5, wherein the distance portion (1) has a negative refractive power, one refracting surface (8) of the two oppositely facing refracting surfaces is reduced in curvature after once increased, the one refracting surface being on the side of an object.

7. A progressive power lens comprising a distance portion (1) having a negative refractive power for looking at a location at a relatively long distance, a reading portion (2) for looking at a location at a relatively short distance, and an intermediate portion (3) between the distance portion and the reading portion for looking at a location at a relatively intermediate distance the curvature of at least one of the oppositely facing refracting surfaces of the distance portion being reduced in curvature from the vicinity of the center of the lens to the peripheral portion thereof, the one refracting surface being on the side of an eye ball.

8. A progressive power lens as recited in claim 7, wherein the distance portion (1) has a negative refractive power, one refracting surface (9) of the two oppositely facing refracting surfaces increases in curvature after once reduced, the one refracting surface being on the side of an eye ball.

9. A progressive power lens comprising a distance portion (1) for looking at a location at a relatively great distance, a reading portion (2) for looking at a location at a relatively short distance, and an intermediate portion (3) between the distance portion and the reading portion for looking at a location at a relatively intermediate distance, the curvature of at least one of the oppositely facing refracting surfaces of the reading portion (2) changes along a principal gazing line (4) of the lens from the vicinity of the center to a peripheral portion of the lens.

10. A progressive power lens as recited in claim 9, characterized wherein one refracting surface (8) of the two oppositely facing refracting surfaces is reduced in curvature at a substantially constant rate from the vicinity of the center of the lens to the peripheral portion thereof, the refracting surface being on the side of an object.

11. A progressive power lens as recited in claim 9, wherein one refracting surface (9) of the two oppositely facing refracting surfaces increases in curvature at a substantially constant rate from the vicinity of the center of the lens to the peripheral portion thereof, the one refracting surface being on the side of an eye ball.

12. A progressive power lens as recited in claim 10, wherein the curvature of the reading portion (2) has a constant value at an interval of at least 7 mm from the vicinity of the center to the peripheral portion of the reading portion, and then changes.

13. A progressive power lens which has a prescription for correcting myopia in the distance portion region, characterized in that a prism, having a magnitude Pt, is provided with a base in the direction of 90°, the prism having no object to cure strabismus, the Pt satisfying the following relationship:

$$-\frac{(4.0-\text{ADD})}{9} \times PW \leqq Pt \leqq -\frac{(8.0-\text{ADD})}{9} \times PW$$

where PW is the prescription for correcting myopia and ADD is an addition power.

* * * * *